United States Patent
Kim et al.

(10) Patent No.: US 11,654,366 B2
(45) Date of Patent: *May 23, 2023

(54) COMPUTER PROGRAM FOR PERFORMING DRAWING-BASED SECURITY AUTHENTICATION

(71) Applicant: Netmarble Corporation, Seoul (KR)

(72) Inventors: Young Soo Kim, Seoul (KR); Young Bak Jo, Gyeonggi-do (KR); Yeongtae Hwang, Seoul (KR)

(73) Assignee: Netmarble Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,697

(22) Filed: Apr. 13, 2022

(65) Prior Publication Data
US 2022/0233963 A1      Jul. 28, 2022

Related U.S. Application Data

(63) Continuation of application No. 16/848,550, filed on Apr. 14, 2020, now Pat. No. 11,358,061.

(30) Foreign Application Priority Data

Apr. 24, 2019   (KR) .................. 10-2019-0047780

(51) Int. Cl.
*A63F 13/71* (2014.01)
*G06F 3/04883* (2022.01)

(52) U.S. Cl.
CPC .......... *A63F 13/71* (2014.09); *G06F 3/04883* (2013.01)

(58) Field of Classification Search
CPC .......... A63F 13/71; A63F 13/67; A63F 13/73; A63F 13/79; G06F 21/36; G06F 3/04883
See application file for complete search history.

(56) References Cited

U.S. PATENT DOCUMENTS

| | | |
|---|---|---|
| 3,910,253 A | 10/1975 | Thomason et al. |
| 2009/0006292 A1 | 1/2009 | Block |

(Continued)

FOREIGN PATENT DOCUMENTS

| | | |
|---|---|---|
| KR | 101337447 B1 | 12/2013 |
| KR | 101739098 B1 | 5/2017 |

(Continued)

OTHER PUBLICATIONS

Florian Schroff et al., "FaceNet: A Unified Embedding for Face Recognition and Clustering", arXiv:1503.03832v3 [cs.DV], Jun. 17, 2015, 10 pages.

(Continued)

*Primary Examiner* — David L Lewis
*Assistant Examiner* — Shauna-Kay Hall
(74) *Attorney, Agent, or Firm* — Umberg Zipser LLP; Ryan Dean

(57) ABSTRACT

Disclosed is a non-transitory computer readable medium storing computer program, in which when the computer program is executed by one or more processors. When the computer program is executed by one or more processors of a computing device, the computer program performs an operation for user drawing-based security authentication, and the operations may include: determining to transmit a first control signal to cause a user terminal to display a first drawing input display, which includes one or more subjects, if a lock display release signal is received from the user terminal; receiving a first drawing input information inputted in accordance with the first drawing input display from the user terminal; and determining whether to release the lock display of the user terminal by inputting the received first drawing input information to a drawing evaluation model.

10 Claims, 13 Drawing Sheets

(56) References Cited

U.S. PATENT DOCUMENTS

| | | | |
|---|---|---|---|
| 2009/0036100 A1 | 2/2009 | Lee | |
| 2010/0031200 A1 | 2/2010 | Chen | |
| 2011/0281633 A1* | 11/2011 | Park | G07F 17/34 |
| | | | 463/20 |
| 2011/0296356 A1 | 12/2011 | Chaudhri et al. | |
| 2012/0304284 A1* | 11/2012 | Johnson | G06F 21/36 |
| | | | 726/19 |
| 2015/0002431 A1* | 1/2015 | Lee | G06F 3/0488 |
| | | | 345/173 |
| 2015/0301738 A1 | 10/2015 | Nishigaki | |
| 2015/0304475 A1 | 10/2015 | Sohn et al. | |
| 2016/0210453 A1 | 7/2016 | Seo et al. | |
| 2018/0348891 A1* | 12/2018 | Kim | G06F 3/04886 |

FOREIGN PATENT DOCUMENTS

| | | | |
|---|---|---|---|
| KR | 1020180037436 A | 4/2018 | |
| KR | 1020180068292 A | 6/2018 | |
| KR | 101886608 B1 | 8/2018 | |
| KR | 101910350 B1 | 1/2019 | |
| KR | 1020190036796 A | 4/2019 | |

OTHER PUBLICATIONS

Korea Patent Office; Office Action; Application No. 10-2019-0047780 dated Aug. 7, 2020, 6 pages.
Oren Rippel et al., "Metric Learning With Adaptive Density Discrimination", arXiv:1511.05939v2 [stat.ML], Mar. 2, 2016, 15 pages.

* cited by examiner

COMPUTER PROGRAM FOR PERFORMING DRAWING-BASED SECURITY AUTHENTICATION

CROSS-REFERENCE TO RELATED APPLICATIONS

This application is a continuation application of U.S. Non-Provisional patent application Ser. No. 16/848,550 filed on Apr. 14, 2020, which itself claims priority to and the benefit of Korean Patent Application No. 10-2019-0047780 filed in the Korean Intellectual Property Office on Apr. 24, 2019, the entire contents of which are incorporated herein by reference.

TECHNICAL FIELD

The present disclosure relates to security authentication, and more particularly, to a computer program for performing drawing-based security authentication.

BACKGROUND ART

With the development of IT devices, the expansion of the fintech business, and the proliferation of the Internet of Things (IoT), a borderless network in which people and things are closely connected to communicate is developing. In addition, the era of hyper-connection in which all things are connected to each other through communication based on the Internet of Everything (IoE) has arrived.

As the Internet environment has expanded from PC to mobile, the use of Internet banking and simple payment services has increased, and various fintechs have appeared, authentication for information protection and payment has become essential rather than optional.

Meanwhile, utilization of biometric authentication has gradually expanded, in fields such as Internet of Things (IoT) devices as well as financial transactions and electronic payments, as well as the development of mobile and communication technologies. As a result, there is a trend of global ICT and distributors rushing to develop technologies by increasing their investment in the biometric authentication business, and the size of the biometric authentication market is expected to grow.

Since the biometric authentication uses unique biometric information of the individual, the accuracy is very high, and security can be enhanced because there is no worry of loss, theft, or forgery like a key or a password. Furthermore, since the biometric authentication allows users to conveniently authenticate themselves without carrying an OTP generator required for authentication by omitting a separate login procedure, the biometric authentication is spotlighted as a next-generation core authentication means of an ICT service with reasonable attractiveness that satisfies both security and convenience.

The biometric authentication may be classified into two schemes, i.e., a scheme of using innate physical features such as fingerprints, faces, retinas and irises of the eyes, etc., and a scheme of using acquired behavioral features such as voice, facial expressions, signatures, and etc.

Biometrics technology using the innate physiological features is a secure security authentication means, but technical, environmental, social, and cognitive limitations which are obstacles of diffusion of the biometric authentication may still exist. Technically, in the case of voice recognition, a result value varies depending on surrounding noise, and in the case of face recognition, the accuracy may vary depending on an angle or the brightness of a camera, and it may be difficult to secure an accurate authentication value due to various environmental factors such as sweat, humidity, wounds, damage, and aging. Furthermore, a separate equipment (e.g., a camera for securing a face image of a user in the case of the face recognition) for securing information on an innate body of the user may be required. Moreover, when there is a blind spot for the biometric authentication, it is necessary to construct a practical response system for various variables such as a person with a worn-out fingerprint or a person with a disability.

This specification incorporates by reference the contents in their entireties of Korean Patent Application No. 10-2012-0029111, filed on Mar. 22, 2012.

SUMMARY OF THE INVENTION

The present disclosure is contrived in response to the background art and has been made in an effort to provide a computer program for performing drawing-based security authentication.

An exemplary embodiment of the present disclosure provides a non-transitory computer readable medium storing computer program which is executable by one or more processors. When the computer program is executed by one or more processors of a computing device, the computer program performs an operation for user drawing-based security authentication, and the operations may include: determining to transmit a first control signal to cause a user terminal to display a first drawing input display, which includes one or more subjects, if a lock display release signal is received from the user terminal; receiving a first drawing input information inputted in accordance with the first drawing input display from the user terminal; and determining whether to release the lock display of the user terminal by inputting the received first drawing input information to a drawing evaluation model.

Alternatively, the operations may further include identifying an idle state of a game executed in the user terminal, and determining to transmit a second control signal to cause the user terminal to display a second drawing input display based on the identified idle state.

Alternatively, the operation of identifying an idle state of a game executed in the user terminal may include at least one operation of identifying a period of time during a first predetermined time from a time point that the game is loaded on the user terminal as the idle state and identifying as the idle state, if an input signal for a game executed in the user terminal has not been inputted for a second predetermined time.

Alternatively, the operations may further include training the drawing evaluation model based on one or more drawing input information received from the user terminal.

Alternatively, the drawing evaluation model may include at least one of a drawing style evaluation sub-model for training the user's unique drawing style information, or a drawing recognition sub-model for determining whether the first drawing input information corresponds to the one or more subjects.

Alternatively, the drawing style evaluation sub-model may be comprised of trained dimension reduction network function among the dimension reduction network function and dimension reconstruction network function trained to output output data similar to the input data.

Alternatively, the drawing style evaluation sub model may be for storing feature data for each user to be matched with tagged user information, wherein the feature data for each user is outputted by inputting training data set comprising training data in which each of the user information is tagged, to a dimension reduction network function, and evaluating drawing style similarity based on a comparison result of the feature data for each user and a first drawing feature information, which is outputted by computing first drawing input information using the trained dimension reduction network function.

Alternatively, the drawing style evaluation sub-model may be for evaluating drawing style similarity by comparing distances on a vector space between a first drawing feature information and the feature data for each user.

Alternatively, the drawing style evaluation sub-model may be for evaluating drawing style similarity based on a comparison result with feature data of a user that matches user information of the first drawing feature information.

Alternatively, the drawing style evaluation sub-model may be trained in a triplet loss method using second training data including a drawing input information of a first user as a target image, another drawing input information of the first user as a target similar image, and a drawing input information of a second user as a target dissimilar image.

Alternatively, the drawing style recognition sub-model may be trained through supervised learning by using third training data generated by labeling one or more image data and a subject corresponding to each of the one or more image data.

Alternatively, the operation of determining whether to release the lock display of the user terminal by inputting the received first drawing input information to a drawing evaluation model may include performing a first determination whether the first drawing input information matches a user's unique drawing style information by using a drawing style evaluation sub-model included in the drawing evaluation model, performing a second determination whether the first drawing input information corresponds to the one or more subjects using a drawing recognition sub-model included in the drawing evaluation model, and determining whether to release the lock screen of the user terminal based on the first determination result and the second determination result.

Alternatively, the operation of performing a first determination whether the first drawing input information matches a user's unique drawing style information by using a drawing style evaluation sub-model included in the drawing evaluation model may include identifying user information corresponding to the first drawing input information, acquiring first drawing feature information of the first drawing input information by inputting the first drawing input information to the drawing style evaluation sub-model, and performing the first determination based on a position in a vector space of the first drawing feature information and a position in the vector space of one or more feature data stored corresponding to the user information.

Another exemplary embodiment of the present disclosure provides a method for performing user drawing-based security authentication. The method may include determining to transmit a first control signal to cause a user terminal to display a first drawing input display, which includes one or more subjects, if a lock display release signal is received from the user terminal; receiving a first drawing input information inputted in accordance with the first drawing input display from the user terminal; and determining whether to release the lock display of the user terminal by inputting the received first drawing input information to a trained drawing evaluation model.

Still another exemplary embodiment of the present disclosure provides a server for performing user drawing-based security authentication. The server may include: a processor including one or more cores; a memory storing program codes executable in the processor; and a network unit transmitting/receiving data with a client, in which the processor is configured to: determine to transmit a first control signal to cause a user terminal to display a first drawing input display, which includes one or more subjects, if a lock display release signal is received from the user terminal; receive a first drawing input information inputted in accordance with the first drawing input display from the user terminal; and determine whether to release the lock display of the user terminal by inputting the received first drawing input information to a trained drawing evaluation model.

According to an exemplary embodiment of the present disclosure, it is possible to provide a computer program for performing drawing-based security authentication.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

DETAILED DESCRIPTION

Figure 1:
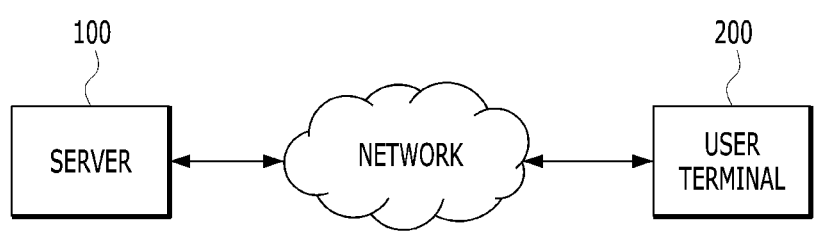
FIG. 1 is a schematic view of a drawing-based authentication system according to an exemplary embodiment of the present disclosure.

Various exemplary embodiments will now be described with reference to the drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, or the case where X uses both A and B. Further, it should be understood that the term "and/or" used in the specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in the present specification and the claims.

Those skilled in the art need to additionally recognize that various illustrative logical blocks, configurations, modules, circuits, means, logic, and algorithm steps described in connection with the exemplary embodiments disclosed herein may be implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The scope of the operations in the claims of the present disclosure arises from the functions and features described in respective operations and is not affected by the order in which respective operations in the claims are disclosed if a sequence relationship of the disclosed order in respective operations constituting the method is not specified. For example, in the claims set forth in the operation including operations A and B, the scope of rights is not limited to the fact that operation A precedes operation B, even if operation A is described before operation B.

FIG. 1 is a schematic view of a drawing-based authentication system according to an exemplary embodiment of the present disclosure.

As illustrated in FIG. 1, a drawing-based authentication system 10 may include a server 100, a network, and a user terminal 200. Components illustrated in FIG. 1 are exemplary and additional components may exist or some of the components illustrated in FIG. 1 may be omitted.

The server 100 and the user terminal 200 may transmit/receive data for a drawing-based authentication system according to the present disclosure to/from each other through the network.

The user terminal 200 in the present disclosure may be at least one terminal that allows a user to play a game. Further, the user terminal 100 may display a game display, etc., based on a signal transmitted in the server 100.

The user terminal 200 may mean a predetermined type of node(s) in a system having a mechanism for communication with the server 100. For example, the user terminal 200 may include a personal computer (PC), a notebook, a mobile terminal, a smart phone, a tablet PC, and a wearable device and include all kinds of terminals which may access a wired/wireless network. Further, the user terminal 200 may include a predetermined server implemented by at least one of agent, application programming interface (API), and plug-in. In addition, the user terminal 200 may include an application source and/or a client application.

The user terminal 200 may perform the game provided by the server 100 by accessing the server 100 and display or release a lock display for security for an account of the user in the process of executing the game. The game in this specification may include a predetermined type of game such as a mobile game, a web game, a VR game, a P2P game, an online/offline game, etc.

The user terminal 200 includes a display to receive an input of the user and provide a predetermined type of output to the user in performing play and/or lock display setting of the game.

According to an exemplary embodiment of the present disclosure, the server 100 may include a predetermined type of computer system or computer device such as a microprocessor, a mainframe computer, a digital processor, a portable device, and a device controller. Further, the server 100 may permit the user terminal 200 to play the game.

According to an exemplary embodiment of the present disclosure, the server 100 may distribute and process the model by using at least one of a CPU, a GPGPU, and a TPU. Further, in an exemplary embodiment of the present disclosure, the server 100 may distribute and process the model together with other computing devices.

In the present specification, a network function may be used interchangeably with an artificial neural network and a neural network. In the present specification, the network function may include one or more neural networks and in this case, an output of the network function may be an ensemble of outputs of one or more neural networks.

In the present specification, a model may include the network function. The model may include one or more network functions and in this case, the output of the model may be an ensemble of the outputs of one or more network functions.

Hereinafter, a method for performing, by the server 100, authentication based on drawing received from the user will be described below in detail with reference to FIG. 2.

Figure 2:
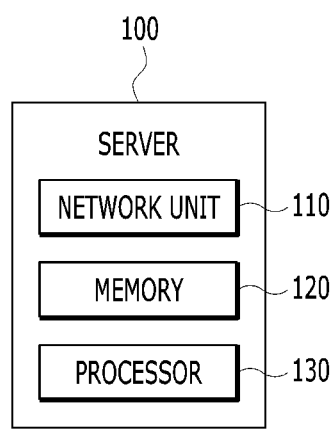
FIG. 2 is a block diagram of a drawing-based security authentication server of a user according to an exemplary embodiment of the present disclosure.

FIG. 2 is a block diagram of a drawing-based security authentication server of a user according to an exemplary embodiment of the present disclosure.

As illustrated in FIG. 2, the server 100 may include a network unit 110, a memory 120, and a processor 130. The aforementioned components are exemplary and the scope of the present disclosure is not limited to the aforementioned components. That is, additional components may be included or some of the aforementioned components may be omitted according to implementation aspects of exemplary embodiments of the present disclosure.

According to an exemplary embodiment of the present disclosure, the server 100 may include the network unit 110 transmitting and receiving data to and from the user terminal 200. The network unit 110 may receive an input from the user terminal 200. For example, the network unit 110 may receive, from the user terminal 200, a lock display setting and/or lock display release signal, and a control signal related to the game display. Additionally, the network unit 110 may permit information transfer between the server 100 and the user terminal 200 in a scheme of invoking a procedure to the server 100.

The network unit 110 according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network unit 110 presented in this specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

In the present disclosure, the network unit 110 may be configured regardless of communication modes such as wired and wireless modes and constituted by various communication networks including a personal area network (PAN), a wide area network (WAN), and the like. Further, the network may be known World Wide Web (WWW) and may adopt a wireless transmission technology used for short-distance communication, such as infrared data association (IrDA) or Bluetooth.

The techniques described in the present specification may also be used in other networks in addition to the aforementioned networks.

According to an exemplary embodiment of the present disclosure, the memory 120 may store any type of information generated or determined by the processor 130 or any type of information received by the network unit 110.

According to an exemplary embodiment of the present disclosure, the memory 120 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The server 100 may operate in connection with a web storage performing a storing function of the memory 120 on the Internet. The description of the memory is just an example and the present disclosure is not limited thereto.

According to an exemplary embodiment of the present disclosure, the processor 130 may be constituted by one or more cores and may include a processor 130 for data analysis and deep training, which include a central processing unit (CPU), a general purpose graphics processing unit (GPGPU), a tensor processing unit (TPU), and the like of the server 100. The processor 130 may read a computer program stored in the memory 120 to perform the drawing-based security authentication according to an exemplary embodiment of the present disclosure.

According to the exemplary embodiment of the present disclosure, the processor 130 may perform a calculation for training the neural network. The processor 130 may perform calculations for training the neural network, which include processing of input data for learning in deep learning (DN), extracting a feature in the input data, calculating an error, updating a weight of the neural network using back-propagation, and the like.

At least one of the CPU, the GPGPU, and the TPU of the processor 130 may process training of the model. For example, both the CPU and the GPGPU may process training of the model and a computation for drawing input information using the model. Further, in an exemplary embodiment of the present disclosure, the processors 130 of a plurality of computing devices are together used to process the training of the model and the computation for the drawing input information through the drawing evaluation model. Further, the computer program executed in the computing device according to an exemplary embodiment of the present disclosure may be a CPU, GPGPU, or TPU executable program.

According to an exemplary embodiment of the present disclosure, the processor 130 may generally process an overall operation of the server 100. The processor 130 processes a signal, data, information, and the like input or output through the components or drives an application program stored in the memory 120 to provide or process information or a function appropriate for the user.

According to an exemplary embodiment of the present disclosure, the processor 130 may identify an idle state of the game executed in the user terminal 200. The idle state may include a state in which the user executes the game through the user terminal 200, but does not perform a separate operation for the game. For example, the processor 130 may identify, as the idle state, a moment when the user does not generate the input for the game or the user is not capable of generating the input for the game. Specifically, the processor 130 may identify, as the idle state, a period of time during a first predetermined time from a time point that the game is loaded on the user terminal 200. Further, the processor 130 may identify, as the idle state of the game executed in the user terminal 200, if an input signal for the game executed in the user terminal 200 has not been inputted for a second predetermined time.

For example, if the first predetermined time is 30 seconds, the processor 130 may identify, as the idle state, a period of time for 30 seconds from a time point (i.e., a log-in time point) when the user terminal 200 accesses the server 100.

As another example, if the first predetermined time is 15 seconds, the processor 130 may identify, as the idle state, a period of time for 15 seconds from a map loading start time point of the game executed in the user terminal 200 or a load start time point for matching an opposing team.

As still another example, if the second predetermined time is 20 seconds, the processor 130 may identify, as the idle state, a time point when the user terminal 200 does not generate an input signal for the game for 20 seconds in the process of executing the game.

In other words, the processor 130 may identify an idle time when the user does not need a separate operation in the process of performing the game through the user terminal 200. A description of specific values of a first predetermined time and a second predetermined time which become criteria for identifying the idle state of the game executed in the user terminal is just an example and the present disclosure is not limited thereto.

According to an exemplary embodiment of the present disclosure, the processor 130 may control the user terminal 200 to display a second drawing input display. Specifically, when the processor 130 identifies the idle state of the game executed in the user terminal 200 and the idle state is identified, the processor 130 may determine to transmit a second control signal to cause the user terminal 200 to display a second drawing input display including one or more subjects. In other words, when the idle state is identified in the user terminal 200, the processor 130 may determine to transmit the second control signal to cause the user terminal 200 to display the second drawing input display. In other words, when being identified as an idle time, the user terminal 200 may display the second drawing input display a plurality of numbers of times based on the second control signal of the processor 130.

The second drawing input display as a display for acquiring unique drawing style information for each user may include one or more subjects. One or more subjects included in the second drawing input display which are provided to induce a user using the user terminal 200 to perform a drawing input for a specific subject may be displayed as at least one of text information and picture information.

For example, one or more subjects may be displayed as text information such as 'Please, input signature information' and may be picture information related to an image for 'chair'. In other words, when one or more subjects included in the second drawing input display are text information such as 'Please, input signature information', the user may manually input a signature thereof on the second drawing input display and when one or more subjects included in the second drawing input display are the picture information related to the image for 'chair', the user may input a drawing portraying the picture information related to the image for the chair on the second drawing input display. A concrete description of text information and image information in which the one or more subjects are displayed is just an example and the present disclosure is not limited thereto.

The processor 130 may receive second drawing input information for the second drawing input display from the user terminal 200. Specifically, the processor 130 may receive the second drawing input information input by the user in response to the second drawing input display displayed on the user terminal 200. In this case, the second drawing input display may be a display for acquiring the unique drawing style information for each user and the unique drawing style information for each user may be acquired through the second drawing input information received through the second drawing input display. Further, the second drawing input information may be included in a first training data set for training the drawing evaluation model in the present disclosure. A concrete description for a method for training a drawing evaluation model 400 of the present disclosure will be described below through the second drawing input information.

The processor 130 may determine whether the second drawing input information received from the user terminal 200 corresponds to the one or more subjects included in the second drawing input display provided to the user terminal 200. In addition, when the second drawing input information received from the user terminal 200 does not correspond to the one or more subjects included in the second drawing input display provided to the user terminal 200, the processor 130 may not use the corresponding second drawing input information as training data for training the drawing evaluation model.

For example, when the one or more subjects included in the second drawing input display provided to the user terminal 200 are text information such as "draw a dog", the processor 130 may determine whether the second drawing input information received through the second drawing input display corresponds to the one or more subjects included in the second drawing input display, i.e., whether the second drawing input information is a picture related to 'dog', Further, when it is determined that the second drawing input information is not the picture related to 'dog', the processor 130 may make the second drawing input information not be included in the first training data set for training the drawing evaluation model. In other words, the processor 130 determines a relationship between the one or more subjects included in the second drawing input display and the second drawing input information received from the user terminal 200 to determine whether the corresponding second drawing input information is to be used as training data for training the drawing evaluation model. A concrete description of the second drawing input display and the second drawing input information described above is just an example and the present disclosure is not limited thereto.

In other words, the processor 130 selects only second drawing input information (i.e., second drawing input information which corresponds to the one or more subjects included in the second drawing input display) suitable for the training data among one or more second drawing input information acquired corresponding to at least one idle state for the game executed in the user terminal 200, respectively to construct the second drawing input information as the first training data set for acquiring the user's unique drawing style information.

As described above, the processor 130 controls the second drawing input display to be displayed corresponding to each of at least one idle time identified in the game executed in the user terminal 200 to receive one or more second drawing input information from the user terminal 200. Further, the processor 130 constructs one or more second drawing input information received from the user terminal 200 as the first training data set to train the unique drawing style for each user. As a result, authentication accuracy of the drawing evaluation model of the present disclosure to be described below may be enhanced.

According to an exemplary embodiment of the present disclosure, the processor 130 may train the drawing evaluation model 400 based on one or more drawing input information received from the user terminal 200. Specifically, the processor 130 may construct the first training data set including one or more training data through one or more second drawing input information received from the user terminal 200 and train the drawing evaluation model 400 through the first training data set.

Figure 6:
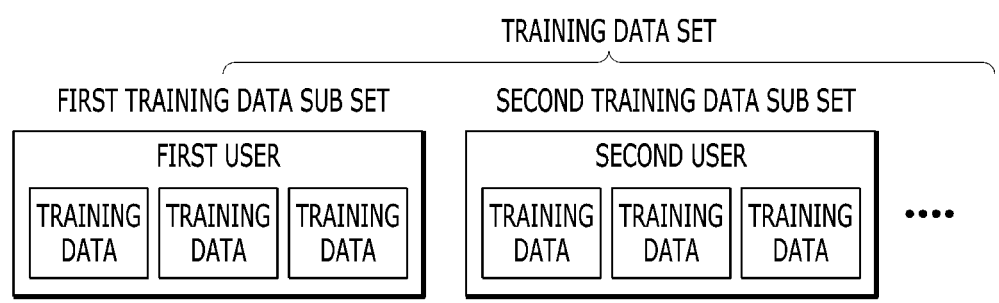
FIG. 6 is a diagram exemplarily illustrating training data for training a drawing evaluation model according to an exemplary embodiment of the present disclosure.

As illustrated in FIG. 6, the first training data set may include one or more training data sub sets. In this case, one or more respective training data sub sets may be classified according to the second drawing input information received corresponding to respective users. In other words, the first training data sub set may include one or more training data corresponding to one or more second drawing input information received from the first user terminal and the second training data sub set may include one or more training data corresponding to one or more second drawing input information received from the second user terminal. In other words, each of one or more training data sub sets may mean a combination of training data generated corresponding to a specific user and a plurality of data sub sets may constitute the first training data set.

Figure 5:
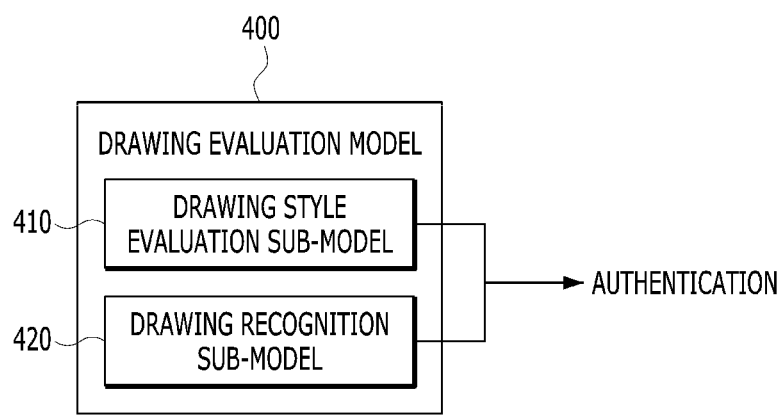
FIG. 5 is a diagram exemplarily illustrating a block diagram of a drawing evaluation model according to an exemplary embodiment of the present disclosure.

The drawing evaluation model 400 may include one or more network functions. Further, as illustrated in FIG. 5, the drawing evaluation model 400 may include at least one model of a drawing style evaluation sub-model 410 for training the user's unique drawing style information and a drawing recognition sub-model 420 for determining whether the drawing input information (e.g., the first drawing input information and the second drawing input information) corresponds to one or more subjects.

According to an exemplary embodiment of the present disclosure, the drawing style evaluation sub-model 410 may be comprised of trained dimension reduction network function among the dimension reduction network function and dimension reconstruction network function trained to output output data similar to the input data by the processor 130. In other words, the drawing style evaluation sub-model 410 may include a dimension reduction network function in a trained configuration of the auto encoder.

According to an exemplary embodiment of the present disclosure, the processor 130 may train the auto encoder through an unsupervised learning scheme. Specifically, the processor 130 may train a dimension reduction network function (e.g., encoder) 411 and dimension reconstruction network function (e.g., decoder) 412 constituting the auto encoder to output the output data similar to the input data. Specifically, only core feature data (alternatively, feature) of one or more image data input during an encoding process through the dimension reduction network function may be trained through a hidden layer and the remaining information may be lost. In this case, during a decoding process through the dimension reconstruction network function, the output data of the hidden layer may be an approximate value of the input data rather than a perfect copy value. In other words, the processor 130 may train the auto encoder by adjusting a weight so that the output data and the input data are as equal as possible.

The auto encoder may be a kind of artificial neural network for outputting output data similar to input data. More specifically, referring to FIG. 8, the auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. In this case, in the example of FIG. 8, the layer of the dimension reduction network function 411 and the layer of the dimension reconstruction network function 412 are shown to be symmetric, but the present disclosure is not limited thereto, and nodes of the layer of the dimension reduction network function 411 and the layer of the dimensional reconstruction network function 412 may be symmetric or not. The auto encoder may perform non-linear dimensional reduction. The numbers of input and output layers may correspond to the number of items of the input data remaining after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to a specific number or more (e.g., half of the input layers or more). A more concrete description of the auto encoder according to the present disclosure will be described below with reference to FIG. 8.

According to an exemplary embodiment of the present disclosure, the processor 130 may store feature data for each user to be matched with user information, wherein the feature data for each user is outputted by inputting a training data set including a plurality of training data in which each of the user information is tagged, to a dimension reduction network function. Specifically, the processor 130 may acquire feature data of a first user for the training data included in the first training data sub set by inputting the first training data sub set in which first user information is tagged, to the dimension reduction network ? by using the drawing style evaluation sub-model 410. The acquired feature data may be expressed as a vector. In this case, since the output feature data of the user corresponding to the plurality of respective training data included in the first training data sub set is an output for the training data for the first user, the feature data may be positioned at a relatively close distance on a vector space. Further, the processor 130 may match and store the first user with the feature data of the first user expressed as the vector.

Figure 9:
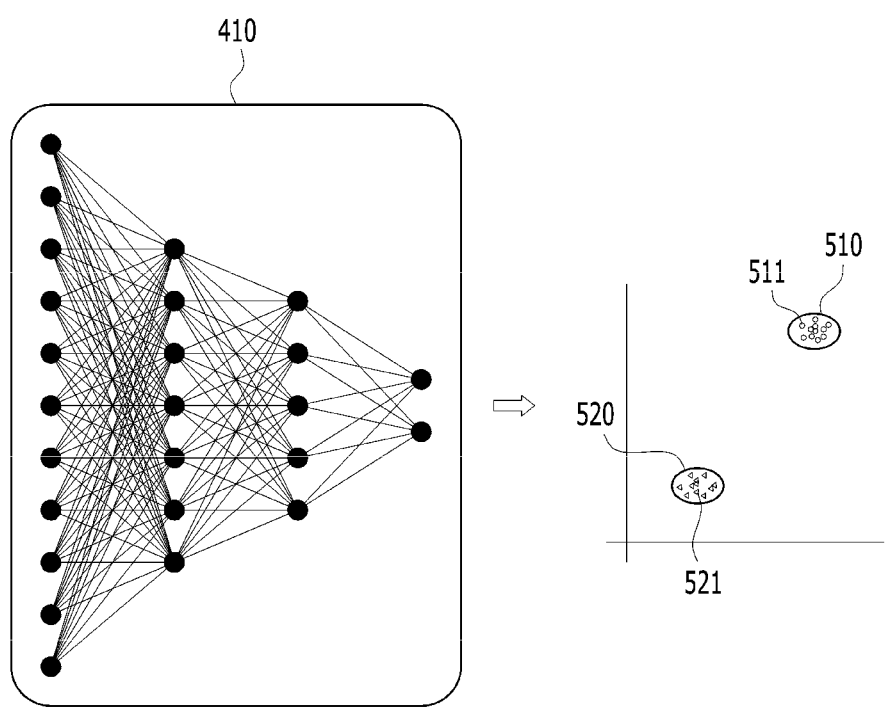
FIG. 9 is a diagram exemplarily illustrating a process of outputting drawing feature information of a user through a drawing style evaluation sub-model according to an exemplary embodiment of the present disclosure.

For example, referring to FIG. 9, the plurality of training data included in the first respective training data sub sets in which the first user information is tagged may be converted into the feature data of the user through the dimension reduction network and displayed on the vector space (510). In other words, first feature data 511 of the user may be output corresponding to the first training data included in the first training data sub set. Further, output (i.e., drawing feature information of the first user) corresponding to the plurality of training data included in the first respective training data sub sets in which the first user information is tagged may be adjacent to a relatively close distance on the vector space as illustrated in FIG. 9 (510). In other words, the drawing style evaluation sub-model 410 may include the trained dimension reduction network of the auto encoder.

The trained dimension reduction network of the auto encoder may be trained so as to well extract a feature which causes the dimension reconstruction network to well reconstruct the input data. Accordingly, the drawing style evaluation sub-model 410 may extract features (i.e., in this case, drawing styles of respective users) so as to well reconstruct the input data.

As another example, referring to FIG. 9, a plurality of training data included in the second respective training data sub sets in which the second user information is tagged may be converted into the feature data of the user through the dimension reduction network and displayed on the vector space (520). In other words, second feature data 521 of the user may be output corresponding to the second training data included in the second training data sub set. Further, output (i.e., drawing feature information of the first user) corresponding to the plurality of training data included in the second respective training data sub sets in which the second user information is tagged may be adjacent to a relatively close distance on the vector space as illustrated in FIG. 9 (520).

The processor 130 may evaluate a drawing style similarity based on a comparison result of the output first feature information and the feature data for each user by computing the first drawing input information by using the trained dimension reduction network function by using the drawing style evaluation sub-model 410. The drawing style evaluation sub-model 410 may be for evaluating the drawing style similarity by comparing distances on the vector space between the first drawing feature information and the feature data for each user.

Specifically, the drawing style evaluation sub-model 410 may be for computing first drawing input information for releasing a lock display received from user terminal A 200 by using the dimension reduction network function to acquire first feature information. In this case, the drawing style evaluation sub-model 410 may identify one or more feature data matched with user A among feature data for each user, which are pre-recorded on the vector space through training. The drawing style evaluation sub-model 410 may evaluate the drawing style similarity by comparing a position of the first feature information on the vector space and a position of one or more feature data matched with user A on the vector space.

Figure 10:
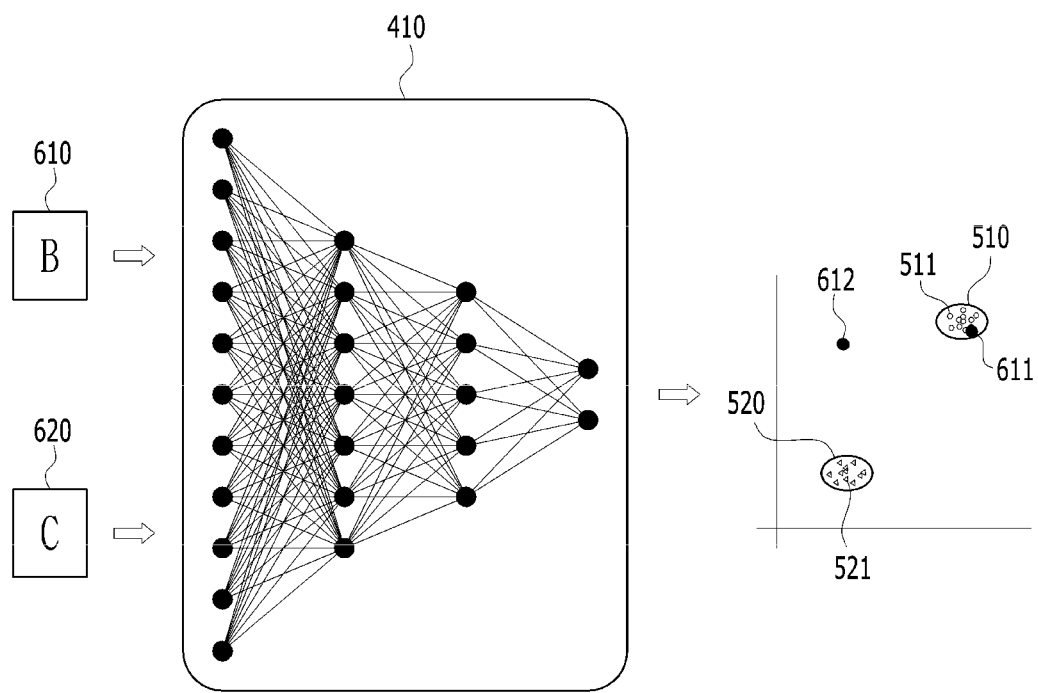
FIG. 10 is a diagram exemplarily illustrating a process of outputting drawing feature information of a user through a drawing style evaluation sub-model according to an exemplary embodiment of the present disclosure.

More specifically, for example, referring to FIG. 10, when first drawing input information 610 of user A, which is received from user terminal A is input to the drawing style evaluation sub-model 410, the processor 130 may acquire the first feature information of user A. Further, the drawing style evaluation sub-model 410 may identify one or more feature data matched with user A among the feature data for each user, which are pre-recorded on the vector space through training (510). As illustrated in FIG. 10, the position of the first feature information of user A on the vector space may be a position relatively close to one or more feature data of user A, which are pre-recorded on the vector space through training. When the position of the first feature information on the vector space has a distance of a predetermined threshold or less from the position of the feature data of user A on the vector space, the processor 130 may determine that the first drawing input information as the input data of the first feature information is acquired from user A. When the position of the first feature information on the vector space is included in a predetermined region on the vector space formed by one or more feature data of user A, the processor 130 may determine that the first drawing input information as the input data of the first feature information is acquired from user A. In other words, when the position of the feature data output in the trained dimension reduction network on the vector space is included in a predetermined region formed by feature data for each user on the vector space, which is predetermined, the processor 130 may determine that the corresponding input data is acquired from a specific user. The drawing style comparison using the dimension reduction network may be caused due to a fact that the dimension reduction network may extract an abstract feature of the drawing input for each user in order to reconstruct the drawing input of the user.

In this case, the processor 130 may evaluate that the first feature information has a high similarity to the feature data of user A. In other words, the processor 130 may evaluate that the first drawing input information 610 received from user A is suitable as the drawing input information for releasing the lock display. In this case, the processor 130 may determine to release the lock display based on an evaluation that the similarity of the drawing style evaluation sub-model 410 is high.

As another example, referring to FIG. 10, when first drawing input information 620 of user B, which is received from user terminal B is input to the drawing style evaluation sub-model 410, the processor 130 may acquire first feature information of user B. Further, the processor 130 may identify one or more feature data matched with user B among the feature data for each user, which are pre-recorded on the vector space through training (520). As illustrated in FIG. 10, the position of the first feature information of user B on the vector space may be a position relatively close to one or more feature data of user B, which are pre-recorded on the vector space through training. In this case, the processor 130 may evaluate that the first feature information has a low similarity to feature data of user B. In other words, in this case, the processor 130 may determine that the corresponding drawing input information is generated from another user rather than user B. In other words, the processor 130 may evaluate that the first drawing input information 620 received from user B is not suitable as the drawing input information for releasing the lock display. In this case, the processor 130 may determine to maintain the lock display based on an evaluation that the similarity of the drawing style evaluation sub-model 410 is low. A description of the first drawing input information corresponding to each user and data displayed in the vector space is just an example and the present disclosure is not limited thereto.

According to another exemplary embodiment of the present disclosure, the processor 130 may train the drawing style evaluation sub-model 410 in a triplet loss method by using the second training data. Specifically, the processor 130 may train the drawing style evaluation sub-model 410 in the triplet loss method using second training data including a drawing input information of a first user as a target image, another drawing input information of the first user as a target similar image, and a drawing input information of a second user as a target dissimilar image.

Figure 11:
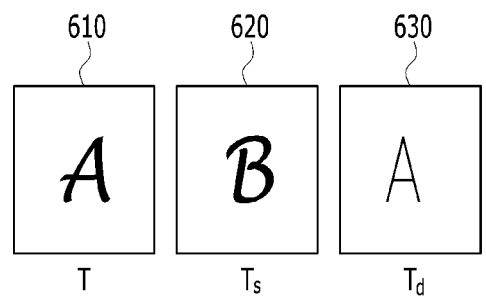
FIG. 11 is a schematic view illustrating a method for training a drawing style evaluation sub-model according to an exemplary embodiment of the present disclosure.

For example, referring to FIG. 11, the drawing input information 610 of the first user included in the second training data may be the target image, another drawing input information 620 of the first user may be a target similar image, and drawing input information 630 of the second user may be the target dissimilar image. In other words, the target similar image may be different drawing input information input through the same user as the target image and the target dissimilar image may be an image having the same subject as the target image, but drawing input information input through a different user. When the drawing style evaluation sub-model 410 is trained using the training data, the drawing style evaluation sub-model 410 may be trained to classify a drawing image from the same user into the same group and classify a drawing image of user A and the drawing image of user B into different groups. A concrete description of the drawing input information is just an example and the present disclosure is not limited thereto.

In other words, the drawing style evaluation sub-model 410 of the present disclosure may include at least one of a dimension reduction network function of the auto encoder trained through the first training data and network function trained using triplet loss through the second training data. Further, the drawing style evaluation sub-model 410 may include both the trained dimension reduction network of the auto encoder and the network function trained in the triplet loss method. The drawing style evaluation sub-model 410 may evaluate the unique drawing style of the user through serial or parallel connection of the trained dimension reduction network function and the network function trained in the triplet loss method.

According to an exemplary embodiment of the present disclosure, the drawing recognition sub-model 420 may be trained through supervised training using third training data generated by labeling a subject corresponding to each of one or more data.

According to an exemplary embodiment of the present disclosure, the processor 130 may generate the third training data by labeling one or more image data and subjects corresponding to the one or more image data, respectively and train the drawing recognition sub-model 420 through the third training data.

Specifically, the processor 130 may train the drawing recognition sub-model 420 including the input layer, one or more hidden layers, and the output layer. The layer may include one or more nodes. The node may be connected to another node through a link. The processor 130 may compute an item input to an input node of the input layer of the drawing recognition sub-model 420 through the link connected to the input node and propagate the computed item to the hidden layer. The computation may include a predetermined mathematical computation. For example, the computation may be a product or a compound product, but the aforementioned description is just an example and the present disclosure is not limited thereto. The processor 130 may compute the item input to an input node of the drawing recognition sub-model 420 through the link connected to the input node and propagate the computed item to the output layer through one or more hidden layers. The processor 130 may calculate drawing recognition information for image data based on a value propagated to the output layer of the drawing recognition sub-model 420. The drawing recognition information may include information on the subject of the image data.

The processor 130 may adjust the weight of the link so that one or more image data and the drawing recognition information have a positive correlation in the drawing recognition sub-model 420.

For example, when image data including 'tree' is used as input data, the processor 130 may adjust the weight of the link so that a probability that an item for 'tree' among one or more items (e.g., subjects) connected to an output of the drawing recognition sub-model 420 will be selected is high.

The processor 130 may compute a first node value of a first node of the drawing recognition sub-model 420 with a second node value of a second node included in a previous layer connected to the first node and a first link weight of a link set in a link connecting the second node included in the previous layer and the first node and derive the first node value. The processor 130 may compute the first node value of the first node of the drawing recognition sub-model 420 with a second link weight set in a link connecting a third node included in a connected next layer connected to the first node and propagate the first node value to a third node.

The processor 130 may input one or more respective image data of the third training data to one or more input nodes included in the input layer of the drawing recognition sub-model 420 in order to train the drawing recognition sub-model 420 and may calculate an error by comparing drawing recognition information computed in the output layer of the drawing recognition sub-model 420 and the subject (i.e., a correct answer). The processor 130 may adjust the weight of the drawing recognition sub-model 420 based on the error. The processor 130 propagates the weight to the input layer from the output layer included in one or more network functions of the drawing recognition sub-model 420 via one or more hidden layers based on the error to update the weight set in each link.

The processor 130 may set a drop out so as to prevent a part of the output of the hidden node from being transferred to a next hidden node in order to prevent overfitting in training of the drawing recognition sub-model 420.

A training epoch may mean that one or more image data are input to one or more input nodes included in the input layer of one or more network functions of the drawing recognition sub-model 420, respectively in respect to all training data included in the training data set, the error is derived by comparing the subject (i.e., the correct answer) labeled to each of one or more image data and a drawing recognition (i.e., the output) of the drawing recognition sub-model 420, and the derived error is propagated to the input layer from the output layer of one or more network functions of the drawing recognition sub-model 420 via one or more hidden layers to update the weight set in each link. In other words, in a case where the computation using the drawing recognition sub-model 420 and the update process of the weight for the drawing recognition sub-model 420 are performed in respect to all training data included in the training data set, one epoch may be set.

When the training epoch for training the drawing recognition sub-model 420 is equal to or less than a predetermined epoch, the processor 130 may set a training rate of the drawing recognition sub-model 420 to a predetermined value or more. When the training epoch for training the drawing recognition sub-model 420 is equal to or more than the predetermined epoch, the processor 130 may set the training rate of the drawing recognition sub-model 420 to a predetermined value or less. The training rate may mean an update degree of the weight. For example, by setting the training rate high at the beginning of training (i.e., setting the update degree of the weight to a large width), the output of the training data may be made to quickly access a label of the training data. For example, by setting the training rate low at the second half of training (i.e., setting the update degree of the weight to a small width), an error between the output of the training data and the label of the training data may be made to be reduced (i.e., accuracy is made to be increased). The description of the training rate is just an example and the present disclosure is not limited thereto.

The processor 130 may perform training of the drawing recognition sub-model 420 during the predetermined epoch or more and then determine whether to stop training by using a verification data set. The predetermined epoch may be a part of an overall training target epoch. The processor 130 may set a part of the training data set as the verification data set. Verification data as data corresponding to the training data may be data for determining whether to stop training. After training of the drawing recognition sub-model 420 is repeated the predetermined epoch or more, the processor 130 may determine whether a training effect of the drawing recognition sub-model 420 is at a predetermined level or higher by using the verification data. For example, when the processor 130 performs training in which a target repeated training number of times is 100000 by using 1 million training data, the processor 130 performs 10000-times repeated training which is a predetermined epoch and then performs 10-times repeated training (i.e., 10 epochs) by using 1000 verification data to determine that further training is meaningless and terminate training when a change of a neural network output is equal to or less than a predetermined level during 10-times repeated training. In other words, the verification data may be used for determining completion of training based on whether an effect of training for each epoch is equal to or more than or less than a predetermined level in repeated training of a neural network. The training data, the number of verification data, and the number of repetition times are just an example and the present disclosure is not limited thereto.

The processor 130 may set at least one of training data sets as a test data set. Test data as data corresponding to the training data may be data used for verifying performance after training a model is completed. The processor 130 may set a subject labeled to one or more image data as the test data set. The processor 130 may determine a correct answer rate of the drawing recognition sub-model 420 for the test data set by inputting the image data included in the test data set to the drawing recognition sub-model 420 and comparing the output output from the drawing recognition sub-model 420 and the labeled subject. The processor 130 inputs the image data of the test data to the drawing recognition sub-model 420 and compares image recognition information (i.e., the output) output from the drawing recognition sub-model 420 and the subject (i.e., the correct answer) included in the test data to determine activation of the drawing recognition sub-model 420 when an error is equal to or less than a predetermined value (i.e., when the correct answer rate is equal to or more than a predetermined level). The processor 130 compares the image recognition information (i.e., the output) output from the drawing recognition sub-model 420 and the subject of the user included in the test data (i.e., the correct answer) and when the error is equal to or more than the predetermined value, the processor 130 may further perform training of the drawing recognition sub-model 420 during a predetermined epoch or more or deactivate the drawing recognition sub-model 420. When the processor 130 deactivates the drawing recognition sub-model 420, the processor 130 may discard the drawing recognition sub-model 420. The processor 130 may determine the performance of the drawing recognition sub-model 420 generated based on elements including accuracy, precision, recall, and the like. A performance evaluation criterion described above is just an example and the present disclosure is not limited thereto. According to an exemplary embodiment of the present disclosure, the processor 130 independently trains one or more network functions included in the each drawing recognition sub-model 420 to generate a plurality of drawing recognition sub-models 420 and evaluates the performance to use only a neural network having predetermined performance or more for drawing recognition.

In other words, the processor 130 computes the first drawing input information received from the user terminal 200 by using the drawing recognition sub-model 420 trained through the aforementioned training method to calculate a subject corresponding to the first drawing input information. In other words, when the processor 130 receives the first drawing input information received through the first drawing input display, the processor 130 determines whether the first drawing input information corresponds to one or more subjects included in the first drawing input display through the trained drawing recognition sub-model 420 to determine whether to release the lock display displayed on the user terminal 200.

According to an exemplary embodiment of the present disclosure, the processor 130 may control a display displayed on the user terminal 200 to be switched to the lock display in response to the lock display setting signal received from the user terminal 200. Specifically, when the processor 130 receives the lock display setting signal from the user terminal 200, the processor 130 may transmit a third control signal to cause the user terminal 200 to display the lock display. The lock display setting signal may be generated corresponding to at least one case of a case where an input from the user is not generated for a third time preset for the game executed in the user terminal 200 or a case where an input signal of the user for an account lock button displayed on the user terminal 200 is input. The preset third time may be determined based on a selection input of the user using the user terminal 200.

The lock display may be a display in which an operation for releasing the lock is required for the user to use the user terminal 200. For example, the lock display may be a display which prevents a predetermined operation on at least one character included in a user account from being performed on the game executed in the user terminal 200. For example, when the lock display is displayed on the user terminal 200, operations such as movement of a character associated with the user terminal 200, battle, item transaction, and entry into a specific event may not be performed. The item transaction may be, for example, an action of delivering at least one of movable items included in an account in the game of the user to another user or dropping at least one item to a shared space in the game. Further, the item transaction may include an action of purchasing or selling the item through cash payment. A concrete description of the operation controlled in the user terminal and the item transaction during the lock display is just an example and the present disclosure is not limited thereto.

For example, when the user presets the preset third time to 1 minute through the user terminal 200 and the input of the user to the user terminal 200 is not generated for 1 minute, the user terminal 200 may generate the lock display setting signal and transmit the generated lock display setting signal to the processor 130. In this case, the processor 130 may transmit the third control signal to cause the user terminal 200 to display the lock display in response to the lock display setting signal received from the user terminal 200.

As another example, when the selection input of the user is input to an account lock button displayed on the user terminal 200, the user terminal 200 may generate the lock display setting signal and transmit the generated lock display setting signal to the processor 130. In this case, the processor 130 may transmit the third control signal to cause the user terminal 200 to display the lock display in response to the lock display setting signal received from the user terminal 200.

In other words, when there is no input of the user to the user terminal 200 for a predetermined time (i.e., the third time) the user selects and inputs the account lock button, the processor 130 may control the lock display to be displayed on the user terminal 200 by receiving the lock display setting signal. As a result, the user may smoothly enjoy the game while the security for the account thereof is secured offline. In other words, when the user deviates from the user terminal 200, an item theft crime that may occur offline may be prevented.

According to an exemplary embodiment of the present disclosure, the processor 130 may control the user terminal 200 to display the first drawing input display including one or more subjects. Specifically, when the processor 130 receives the lock display release signal from the user terminal 200, the processor 130 may determine to transmit a first control signal to cause the user terminal 200 to display the first drawing input display including one or more subjects. One or more subjects included in the first drawing input display which are determined to induce the user using the user terminal 200 to perform a drawing input for a specific subject may be displayed as at least one of text information and picture information.

Figure 3:
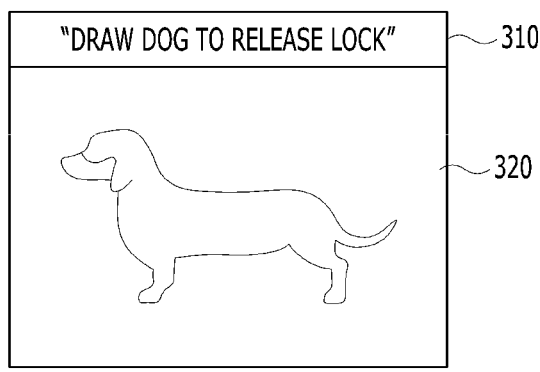
FIG. 3 is a diagram exemplarily illustrating a first drawing input display according to an exemplary embodiment of the present disclosure.

As a specific example, as illustrated in FIG. 3, the first drawing input display 300 displayed on the user terminal 200 may include one or more subjects 310 displayed as text information such as "draw a dog to release the lock". In other words, when the first drawing input display 300 illustrated in FIG. 3 is displayed on the user terminal 200, the user may input a drawing corresponding to the one or more subjects to a user drawing input region 320. In other words, the user may input a drawing associated with 'dog' corresponding to one or more subjects 310 as illustrated in FIG. 3. A concrete description of the first drawing input display is just an example for helping understanding of the present disclosure and the present disclosure is not limited thereto.

According to an exemplary embodiment of the present disclosure, the processor 130 may determine one or more subjects included in the first drawing input display to be different from one or more subjects included in the second drawing input display. Specifically, the processor 130 may determine one or more subjects included in the first drawing input display for receiving the first drawing input information from the user in order to release the lock display and the second drawing input display for receiving the second drawing input information in order to acquire the unique drawing style information of the user, respectively to be different from each other.

For example, when one or more subjects displayed as text information such as 'draw a clock' are included in the second drawing input display (i.e., a display for receiving second drawing information for training the evaluation model) for acquiring the unique drawing style information of the user and the second drawing input information is received through the corresponding second drawing input display and constructed as the training data for acquiring the unique drawing style information of the user, one or more subjects included in the first drawing input display for releasing the lock display of the user terminal 200 may be determined not to be associated with 'clock'. A concrete description of the first drawing input display and the second drawing input display described above is just an example and the present disclosure is not limited thereto.

The first drawing input information which becomes a criterion for whether the user releases the lock may be a drawing input for a subject different from the second drawing input information. The processor 130 determines one or more subjects included in the first drawing input display and the second drawing input display, respectively to be different from each other to make the first drawing input information and the second drawing input information for determining whether to release the lock display of the user terminal 200 be different from each other.

In other words, when the user intends to release the lock display, the user may receive the first drawing input display having a different subject from the second drawing input information secured while performing the game through the user terminal 200. In other words, when the user intends to release the lock display, the subject included in the first drawing input display may be different from the subject included in the second drawing input display, and as a result, the user may input an existing drawing input which is not drawn to the first drawing input display.

Accordingly, the processor 130 receives the first drawing input information which the user does not draw previously to determine whether to release the lock display of the user terminal 200 to enhance the security for the authentication. Specifically, the subject different from the second drawing input display is displayed on the first drawing input display, so the drawing input which the user does not draw previously is received, and as a result, a replay-attack such as portraying a similar style to a fixed drawing or replicating already input information and inputting the input information again is prevented, thereby enhancing the security for the authentication.

According to an exemplary embodiment of the present disclosure, the processor 130 may receive the first drawing input information input corresponding to the first drawing input display from the user terminal. Specifically, the processor 130 may receive the first drawing input information of the user input in response to the first drawing input display to the user terminal 200.

According to an exemplary embodiment of the present disclosure, the processor 130 may determine whether to release the lock display displayed on the user terminal by inputting the first drawing input information to the drawing evaluation model. In this case, the drawing evaluation model may be a model trained through the training process.

Specifically, the processor 130 may perform a first determination as to whether the first drawing input information matches a user's unique drawing style information by using a drawing style evaluation sub-model 410 included in a drawing evaluation model 400.

The drawing style evaluation sub-model 410 may output first drawing feature information and record the output first drawing feature information on the vector space by inputting the first drawing input information from the user terminal and identify one or more feature data matched with user information of the user terminal among feature data for each user, which are previously recorded on the vector space through training. Further, the drawing style evaluation sub-model 410 may evaluate the drawing style similarity by comparing a position of first drawing feature information on the vector space and a position of one or more feature data matched with the user information of the user terminal on the vector space.

In other words, when an evaluation that the first drawing input information is suitable as the drawing input information for releasing the lock display is output through the drawing style evaluation sub-model 410, the processor 130 may determine to release the lock display displayed on the user terminal 200. Further, when an evaluation that the first drawing input information is not suitable as the drawing input information for releasing the lock display is output through the drawing style evaluation sub-model 410, the processor 130 may determine to maintain the lock display displayed on the user terminal 200.

The processor 130 may perform a second determination as to whether the first drawing input information corresponds to one or more subjects through the drawing recognition sub-model included in the drawing evaluation model 400.

When specific image data is input through pre-training, the drawing recognition sub-model 420 classifies input images to output a subject corresponding to a specific image. In other words, the drawing recognition sub-model 420 may be a model that may output the subject corresponding to the first drawing input information by inputting the first drawing input information.

The processor 130 may output the subject corresponding to the first drawing input information through the drawing recognition sub-model 420 and identify one or more subjects included in the first drawing input display provided to the user terminal 200 in order to receive the first drawing input information. The processor 130 may compare one or more subjects included in the first drawing input display and the subject output through the drawing recognition sub-model 420 and when the respective subjects are matched with each other, the processor 130 may determine to release the lock display displayed on the user terminal 200.

The processor 130 may determine whether to release the lock display displayed on the user terminal based on the first determination result and the second determination result. Specifically, the processor 130 may determine to release the lock display by considering both whether the first drawing input information received from the user terminal 200 is matched with the unique drawing style of the user and whether the first drawing input information corresponds to the presented subject.

For example, when the first drawing input information received from the user terminal 200 is matched with the unique drawing style of the user, but does not correspond to the presented subject, the processor 130 may determine to maintain the lock display.

As another example, when the first drawing input information received from the user terminal 200 corresponds to the presented subject, but is not matched with the unique drawing style of the user, the processor 130 may determine to maintain the lock display.

In other words, only when the first drawing input information received from the user terminal 200 is matched with the unique drawing style of the user and the first drawing input information corresponds to the presented subject, the processor 130 may determine to release the lock display.

Accordingly, when the user intends to release the lock display, the processor 130 may release the lock display only when the first drawing input information corresponds to the unique drawing style of the user and a predetermined presented subject, which may cause the user to provide enhanced security for an account thereof.

According to an exemplary embodiment of the present disclosure, the processor 130 may construct the training data set through the first drawing input information. Specifically, when the processor 130 releases the lock display displayed on the user terminal 200 by receiving the first drawing input information from the user through the first drawing input display, the processor 130 may construct the corresponding first drawing input information as the training data set. In other words, the first drawing input information for releasing the lock display may be used later as training data for enhancing the accuracy of the output of the drawing evaluation model 400.

Figure 4:
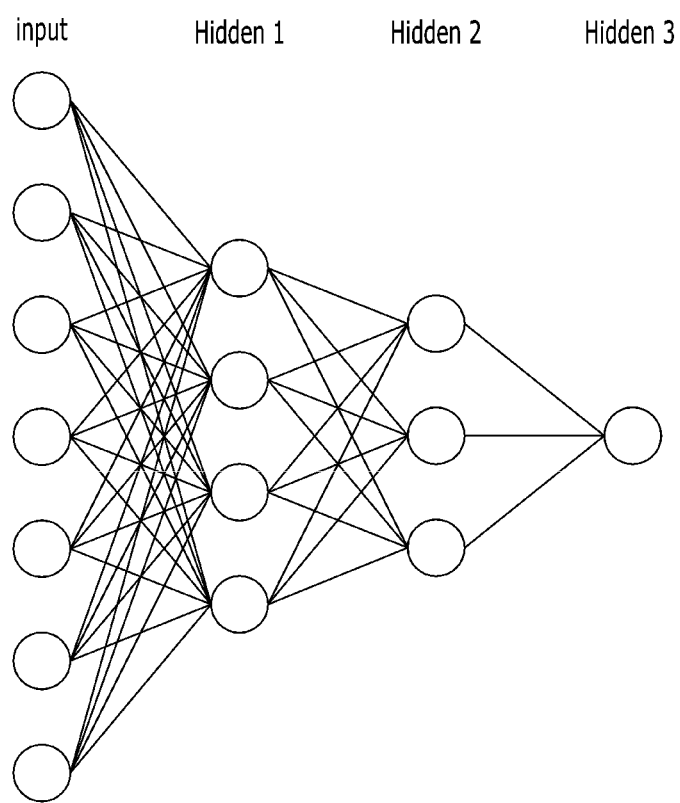
FIG. 4 is a schematic view illustrating a network function according to an exemplary embodiment of the present disclosure.

FIG. 4 is a schematic view illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called "node". The "nodes" may also be called "neurons". The neural network is configured to include one or more nodes. The nodes (alternatively, neurons) constituting the neural networks may be connected to each other by one or more "links".

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of the output node may be determined based on data input in the input node. Here, a node connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationship in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be configured to include one or more nodes. Some of the nodes constituting the neural network may constitute one layer based on distances from an initial input node. For example, an aggregation of nodes of which the distance from the initial input node is n may constitute an n layer. The distance from the initial input node may be defined by the minimum number of links through which should pass for reaching the corresponding node from the initial input node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network. In the neural network according to an exemplary embodiment of the present disclosure, the number of nodes of the input layer may be the same as the number of nodes of the output layer, and the neural network may be a neural network of a type in which the number of nodes decreases and then, increases again as the layer progresses from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases as the layer progresses from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases as the layer progresses from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, potential structures of photos, text, video, voice, and music (e.g., what objects are in the picture, what the content and feelings of the text are, what the content and feelings of the voice are) may be determined. The deep neural network may include a convolutional neural network, a recurrent neural network (RNN), an auto encoder, generative adversarial networks (GAN), a restricted Boltzmann machine (RBM), a deep belief network (DBN), a Q network, a U network, a Siam network, and the like. The disclosure of the deep neural network described above is just an example and the present disclosure is not limited thereto.

The neural network may be learned in at least one scheme of supervised learning, unsupervised learning, and semi supervised learning. Learning of the neural network is to minimize errors in output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network) of actual data, and as a result, there may be a learning cycle in which errors for the learning data decrease, but the errors for the actual data increase. Overfitting is a phenomenon in which the errors for the actual data increase due to excessive learning of the learning data. For example, a phenomenon in which a neural network that learns a cat by showing a yellow cat views cats other than the yellow cat and does not recognize that the cats other than the yellow cat are the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, etc., may be applied.

Figure 7:
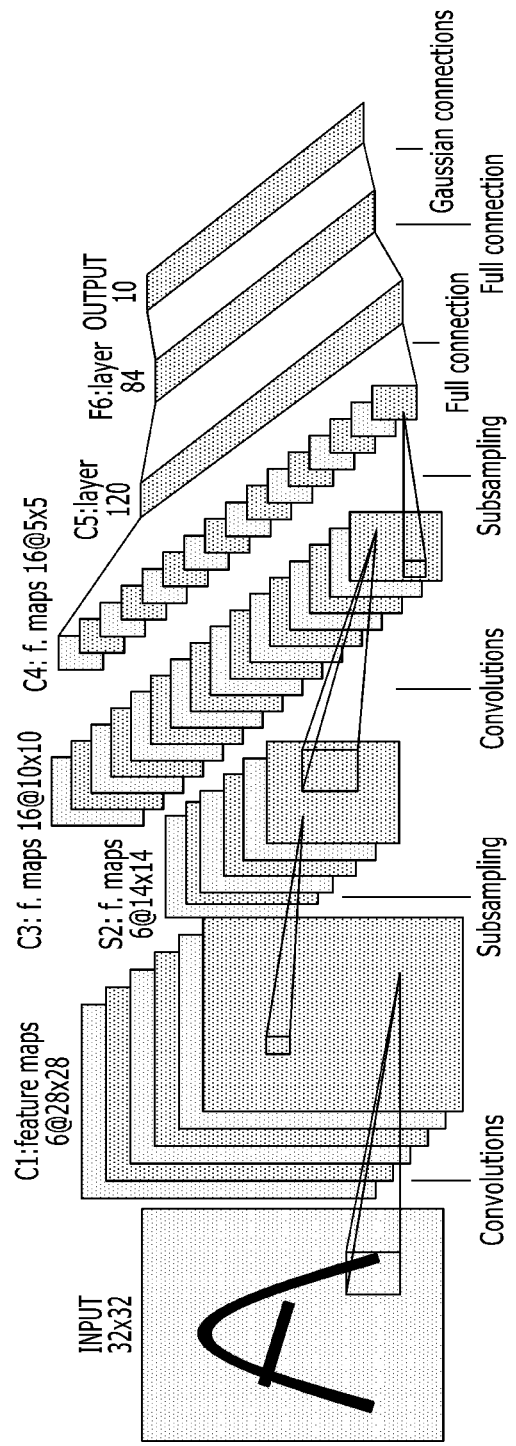
FIG. 7 is a schematic view illustrating a convolutional neural network according to an exemplary embodiment of the present disclosure.

FIG. 7 is a schematic view illustrating a convolutional neural network according to an exemplary embodiment of the present disclosure.

The convolutional neural network (CNN) illustrated in FIG. 7 as a type of deep neural network includes a neural network that includes a convolutional layer. The convolutional neural network is a type of multilayer perceptrons designed to use minimal preprocessing. The CNN may be constituted by one or more convolutional layers and artificial neural network layers associated therewith and may additionally use the weight and pooling layers. Such a structure allows the CNN to fully utilize the input data of a two-dimensional structure. The convolutional neural network may be used for recognizing an object in an image. The convolutional neural network may represent and process image data as a matrix having the dimension. For example, in the case of image data encoded in red-green-blue (RGB), the image data may be represented as a two-dimensional (for example, a two-dimensional image) matrix for each of R, G, and B colors. That is, a color value of each pixel of the image data may become a component of the matrix and a size of the matrix may be equal to the size of the image. Accordingly, the image data may be represented by three two-dimensional matrix (three-dimensional data array).

In the convolutional neural network, matrix components at respective positions of the convolutional filter and the image are multiplied by each other while moving the convolutional filter to perform a convolutional process (input/output of a convolutional layer). The convolutional filter may be constituted by an n*n type matrix and may be generally configured as a fixed type filter smaller than the number of all pixels of the image. In other words, when m*m images are input to the convolutional layer (e.g., a convolutional layer in which the size of the convolutional filter is n*n), a matrix representing n*n pixels including each pixel of the image may be a component product with the convolutional filter (i.e., a product of respective components of the matrix). Components matched with the convolutional filter may be extracted from the image by the product with the convolutional filter. For example, a 3*3 convolutional filter for extracting a vertical straight line component from the image may be configured as [[0,1,0],[0,1,0],[0,1,0]] and when the convolutional filter is applied to an input image, the vertical straight line component matched with the convolutional filter may be extracted and output from the image. The convolutional layer may apply the convolutional filter to respective matrixes (i.e., R, G, and B colors in the case of R, G, and B coding images) for respective channels representing the image. The convolutional layer may extract feature data matched with the convolutional filter from the input image by applying the convolutional filter to the input image. A filter value (i.e., a value of each component of the matrix) of the convolutional filter may be updated by back propagation during a training process of the convolutional neural network.

A subsampling layer is connected to the output of the convolutional layer to simplify the output of the convolutional layer, thereby reducing a memory usage and a computational amount. For example, when the output of the convolutional layer is input to a pooling layer having a 2*2 max pooling filter, a maximum value included in each patch is output every 2*2 patches in each pixel of the image to compress the image. The aforementioned pooling may be a method that outputs a minimum value in the patch or outputs an average value of the patch and a predetermined pooling method may be included in the present disclosure.

The convolutional neural network may include one or more convolutional layers and subsampling layers. The convolutional neural network repeatedly performs the convolutional process and a subsampling process (e.g., the aforementioned max pooling) to extract the feature data from the image. The neural network may extract global feature data of the image through the repeated convolutional process and subsampling process.

The output of the convolutional layer or the subsampling layer may be input to a fully connected layer. The fully connected layer is a layer in which all neurons in one layer and all neurons in an adjacent layer are connected. The fully connected layer may mean a structure in which all nodes of each layer are connected to all nodes of another layer in the neural network.

In an exemplary embodiment of the present disclosure, the neural network may include a deconvolutional neural network (DCNN) in order to perform segmentation of the image data. The deconvolutional neural network may perform a similar operation to calculating the convolutional neural network in a reverse direction and output the feature data extracted from the convolutional neural network as a picture map related to original data.

Figure 8:
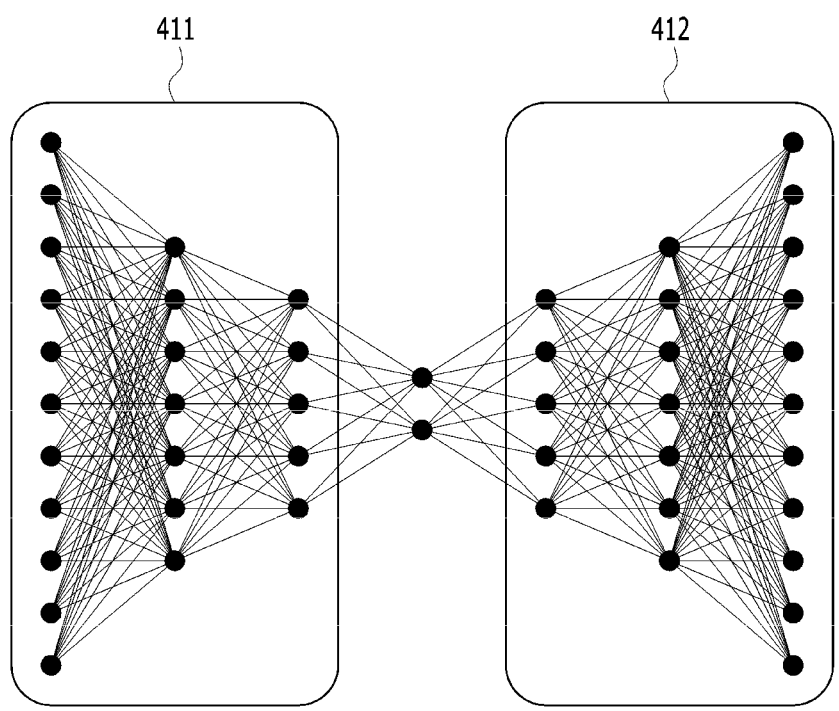
FIG. 8 is a diagram exemplarily illustrating an auto encoder according to an exemplary embodiment of the present disclosure.

FIG. 8 is a diagram exemplarily illustrating an auto encoder according to an exemplary embodiment of the present disclosure.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. In this case, in the example of FIG. 8, it is illustrated that the dimension reduction layer and the dimension reconstruction layer are symmetric, but the present disclosure is not limited thereto and the nodes of the dimension reduction layer and the dimension reconstruction layer may be symmetric or not. The auto encoder may perform non-linear dimensional reduction. The number of input and output layers may correspond to the number of sensors remaining after pre-processing the input data. The auto encoder structure may have a structure in which the number of nodes in the hidden layer included in the encoder decreases as a distance from the input layer increases. When the number of nodes in the bottleneck layer (a layer having a smallest number of nodes between an encoder and a decoder) is too small, a sufficient amount of information may not be delivered, and as a result, the number of nodes in the bottleneck layer may be maintained to be a specific number or more (e.g., half of the input layers or more).

Figure 12:
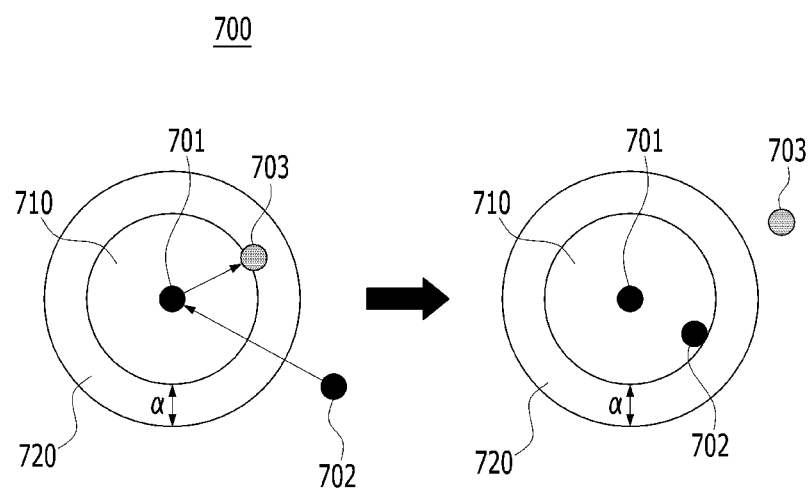
FIG. 12 is a schematic view illustrating a method for training a drawing style evaluation sub-model according to an exemplary embodiment of the present disclosure.

FIG. 12 is a schematic view illustrating a method for training a drawing style evaluation sub model according to an exemplary embodiment of the present disclosure.

The drawing style evaluation sub-model 410 of the present disclosure is trained so that similar data form a cluster in a resolution space 700. More specifically, the drawing style evaluation sub-model 410 is trained so that target data 701 and target similar data 702 are included in one cluster 710 and target dissimilar data 703 is included in a different cluster from that of the target data 701 and the target similar data 702.

Respective clusters may be positioned to have a predetermined distance margin 720 in the resolution space of the trained drawing style evaluation sub-model 410.

The drawing style evaluation sub-model 410 may receive a training data sub set including the target data 701, the target similar data 702, and the target dissimilar data 703 and map the respective data to the resolution space and update weights of one or more network functions included in the drawing style evaluation sub-model 410 so as to be clustered according to cluster information labeled in the resolution space. In other words, the drawing style evaluation sub-model 410 may be trained so that the target data 701 and the target similar data 702 are close to each other in the resolution space and the target data 701, the target similar data 702, and the target dissimilar data 703 are far away from each other in the resolution space. The drawing style evaluation sub-model 410 may be trained by using, for example, a triplet based cost function. The triplet based cost function is used for separating a pair of input data which are the same classification from third input data of a different classification and a difference value between a first distance (i.e., a size of a cluster 710) between the pair of input data which are the same and a second distance (i.e., a distance between 701 or 702 and 703 between one of the pair of input data which are the same classification and the third input data) is at least a distance margin 720 and a method for training the drawing style evaluation sub-model 410 includes reducing the first distance to a predetermined ratio of a distance margin or less. Here, the distance margin 720 may be continuously a positive number. The weights of one or more network functions included in the drawing style evaluation sub-model 410 may be updated so as to reach the distance margin 720 and the weight update may be performed every iteration or every epoch. Entire detailed contents of the distance margin are disclosed in "FaceNet:, A Unified Embedding for Face Recognition and Clustering" of Schroff, etc., and Korean Patent Unexamined Publication No. 10-2018-0068292, which are incorporated herein by reference.

The drawing style evaluation sub-model 410 may be trained as a magnet loss based model which may consider a semantic relationship between respective data even in one cluster or between different clusters in addition to a cluster classification of dissimilar data. An initial distance between center points of respective clusters in the resolution space of the drawing style evaluation sub-model 410 may be modified during the training process. The drawing style evaluation sub-model 410 may map the data to the resolution space and then adjust a position of each data in the resolution space based on a similarity between a cluster to which each data belongs and data inside and outside the cluster. Entire detailed contents related to training of the drawing style evaluation sub-model 410 based on magnet loss are disclosed in "METRIC LEARNING WITH ADAPTIVE DENSITY DISCRIMINATION" by O. Rippel, etc., which are incorporated herein by reference.

Figure 13:
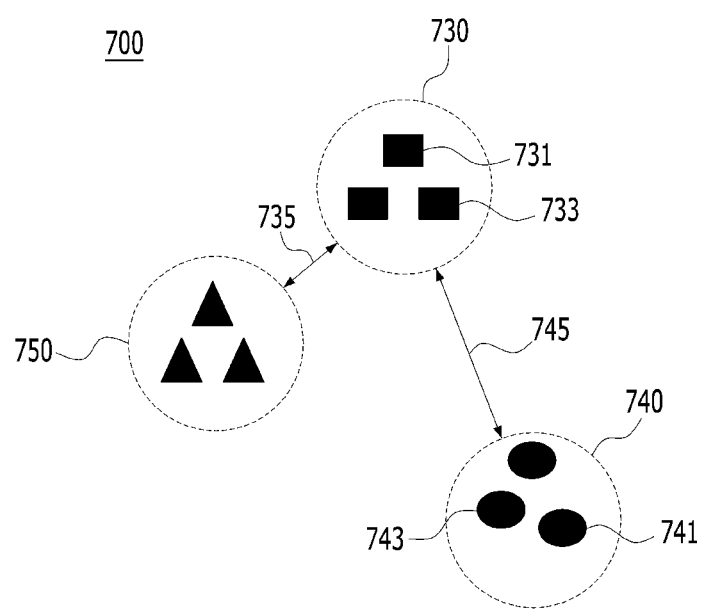
FIG. 13 is a schematic view illustrating a resolution space of a drawing style evaluation sub-model according to an exemplary embodiment of the present disclosure.

FIG. 13 is a schematic view illustrating a corresponding space of a drawing style evaluation sub model according to an exemplary embodiment of the present disclosure.

FIG. 13 is a schematic view illustrating the resolution space 700 of the trained drawing style evaluation sub-model. The resolution space 700 illustrated in FIG. 13 is just an example and the drawing style evaluation sub-model 410 may include a predetermined number of clusters and a predetermined number of data per cluster.

Shapes of data 731, 733, 741, 743, etc., included in the cluster illustrated in FIG. 13 are just examples for indicating similar data.

In the present disclosure, the resolution space may be configured by spaces of one-dimension or more and may include one or more clusters and each cluster may be configured based on the positions of the feature data based on each target data and the feature data based on the target similar data on the resolution space.

In the resolution space, a first cluster 730 and a second cluster 740 may be clusters for the dissimilar data. Further, a third cluster 750 may be a cluster for dissimilar data to the first and second clusters. Distances 745 and 735 between the clusters may be measures indicating differences between data belonging to respective clusters.

A twelfth distance 745 between the first cluster 730 and the second cluster 740 may be a measure indicating between a difference between data belonging to the first cluster 730 and data belonging to the second cluster 740. Further, a thirteenth distance 735 between the first cluster 730 and the second cluster 740 may be a measure indicating between a difference between data belonging to the first cluster 730 and data belonging to the third cluster 750. In the example illustrated in FIG. 13, the data belonging to the first cluster 730 may be more dissimilar to the data belonging to the second cluster 740 than to the data belonging to the third cluster 750. In other words, when the distance between the clusters is large, data belonging to the respective clusters may be more dissimilar and when the distance between the clusters is small, data belonging to the respective clusters may be less dissimilar. The distances 735 and 745 between the clusters may be larger than a radius of the cluster by a predetermined ratio. The processor 130 computes the input data by using the drawing style evaluation sub-model 410 to classify the input data based on a position at which the feature data of the input data is mapped to the resolution space of the drawing style evaluation sub-model 410.

The processor 130 processes the input data by using the pre-trained drawing style evaluation sub-model 410 to map the feature data of the input data to the resolution space of the pre-trained drawing style evaluation sub-model 410. The processor 130 may classify the input data based on which cluster among one or more clusters on the resolution space the input data belongs to based on the position of the input data on the resolution space.

In other words, the processor 130 may determine a final evaluation result for a style of which user the drawing input information (i.e., input data) is similar to at least partially based on a classification result for the input data of the drawing style evaluation sub-model 410. Specifically, when the drawing style evaluation sub-model 410 classifies the input data to belong to a specific cluster, the processor 130 may generate an evaluation result matched with a specific cluster as a secondary evaluation result and determine the final evaluation result based on the secondary evaluation result. Further, when the drawing style evaluation sub-model 410 fail to classify the input data, the processor 130 may determine a primary evaluation result as the final evaluation result.

Accordingly, as the processor 130 classifies the input data of the drawing style evaluation sub-model 410 trained through the triplet loss method into the cluster, the processor 130 may determine whether a drawing style for drawing input information to be authenticated is matched with a drawing style of a specific user.

Figure 14:
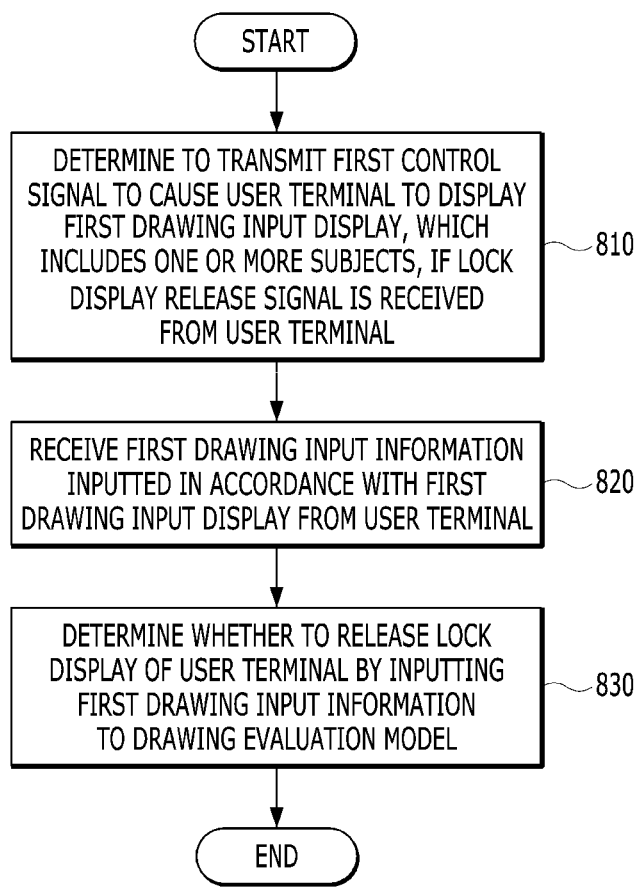
FIG. 14 is a flowchart for performing a drawing-based security authentication of a user according to an exemplary embodiment of the present disclosure.

FIG. 14 is a flowchart for performing a drawing-based security authentication server of a user according to an exemplary embodiment of the present disclosure.

According to an exemplary embodiment of the present disclosure, when the server 100 receives a lock display release signal from the user terminal, the server 100 may determine to transmit a first control signal to cause the user terminal to display a first drawing input display, which includes one or more subjects (810).

According to an exemplary embodiment of the present disclosure, the server 100 may receive first drawing input information input corresponding to the first drawing input display from the user terminal 200 (820).

According to an exemplary embodiment of the present disclosure, the server 100 may determine whether to release the lock display of the user terminal 200 by inputting the first drawing input information to a drawing evaluation model (830).

The steps of FIG. 14 described above may be changed in order as necessary, and at least one or more steps may be omitted or added. That is, the aforementioned steps are just an exemplary embodiment of the present disclosure and the scope of the present disclosure is not limited thereto.

Figure 15:
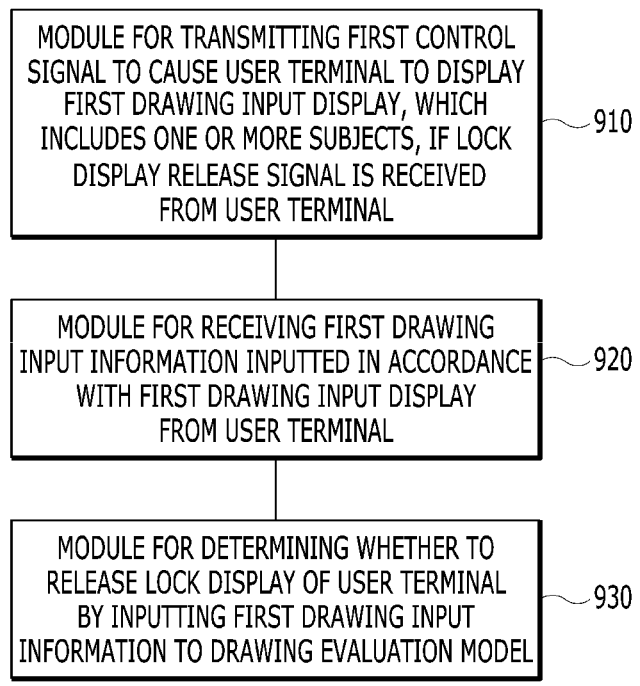
FIG. 15 illustrates a module for implementing a method for performing a drawing-based security authentication of a user according to an exemplary embodiment of the present disclosure.

FIG. 15 illustrates a module for implementing a method for performing a drawing-based security authentication of a user according to an exemplary embodiment of the present disclosure.

According to an exemplary embodiment of the present disclosure, a computer program may be implemented by the following modules.

According to an exemplary embodiment of the present disclosure, the computer program may include a module 910 for determining to transmit a first control signal to cause a user terminal to display a first drawing input display, which includes one or more subjects, if a lock display release signal is received from the user terminal, a module 920 for receiving a first drawing input information inputted in accordance with the first drawing input display from the user terminal, and a module 930 for determining whether to release the lock display of the user terminal by inputting the received first drawing input information to a drawing evaluation model.

Alternatively, the computer program may further include a module for identifying an idle state of a game executed in the user terminal, and a module for determining to transmit a second control signal to cause the user terminal to display a second drawing input display based on the identified idle state.

Alternatively, the module for identifying an idle state of a game executed in the user terminal may include at least one module of a module for identifying a period of time during a first predetermined time from a time point that the game is loaded from the user terminal as the idle state and a module for identifying as the idle state, if an input signal for a game executed in the user terminal has not been inputted for a second predetermined time.

Alternatively, the computer program may further include a module for training the drawing evaluation model based on one or more drawing input information received from the user terminal.

Alternatively, the drawing evaluation model may include at least one of a drawing style evaluation sub-model for training the user's unique drawing style information, or a drawing recognition sub-model for determining whether the first drawing input information corresponds to the one or more subjects.

Alternatively, the drawing style evaluation sub-model may be comprised of trained dimension reduction network function among the dimension reduction network function and dimension reconstruction network function trained to output output data similar to the input data.

Alternatively, the drawing style evaluation sub model may be for storing feature data for each user to be matched with tagged user information, wherein the feature data for each user is outputted by inputting training data set comprising training data in which each of the user information is tagged, to a dimension reduction network function, and evaluating drawing style similarity based on a comparison result of the feature data for each user and a first drawing feature information, which is outputted by computing first drawing input information using the trained dimension reduction network function.

Alternatively, the drawing style evaluation sub-model may be for evaluating drawing style similarity by comparing distances on a vector space between a first drawing feature information and the feature data for each user.

Alternatively, the drawing style evaluation sub-model may be for evaluating drawing style similarity based on a comparison result with feature data of a user that matches user information of the first drawing feature information.

Alternatively, the drawing style evaluation sub-model may be trained in a triplet loss method using second training data comprising a drawing input information of a first user as a target image, another drawing input information of the first user as a target similar image, and a drawing input information of a second user as a target dissimilar image.

Alternatively, the drawing recognition sub-model may be trained through supervised learning by using third training data generated by labeling one or more image data and a subject corresponding to each of the one or more image data.

Alternatively, the module for determining whether to release the lock display of the user terminal by inputting the received first drawing input information to a drawing evaluation model may include a module for performing a first determination whether the first drawing input information matches a user's unique drawing style information by using a drawing style evaluation sub-model included in the drawing evaluation model, a module for performing a second determination whether the first drawing input information corresponds to the one or more subjects using a drawing recognition sub-model included in the drawing evaluation model, and a module for determining whether to release the lock screen of the user terminal based on the first determination result and the second determination result.

Alternatively, the module for performing a first determination whether the first drawing input information matches a user's unique drawing style information by using a drawing style evaluation sub-model included in the drawing evaluation model may include a module for identifying user information corresponding to the first drawing input information, a module for acquiring first drawing feature information of the first drawing input information by inputting the first drawing input information to the drawing style evaluation sub-model, and a module for performing the first determination based on a position in a vector space of the first drawing feature information and a position in the vector space of one or more feature data stored corresponding to the user information.

According to an exemplary embodiment of the present disclosure, a module for implementing a method for performing drawing based security authentication of a user may be implemented by a means, a circuit, or a logic for implementing a computing program.

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

Figure 16:
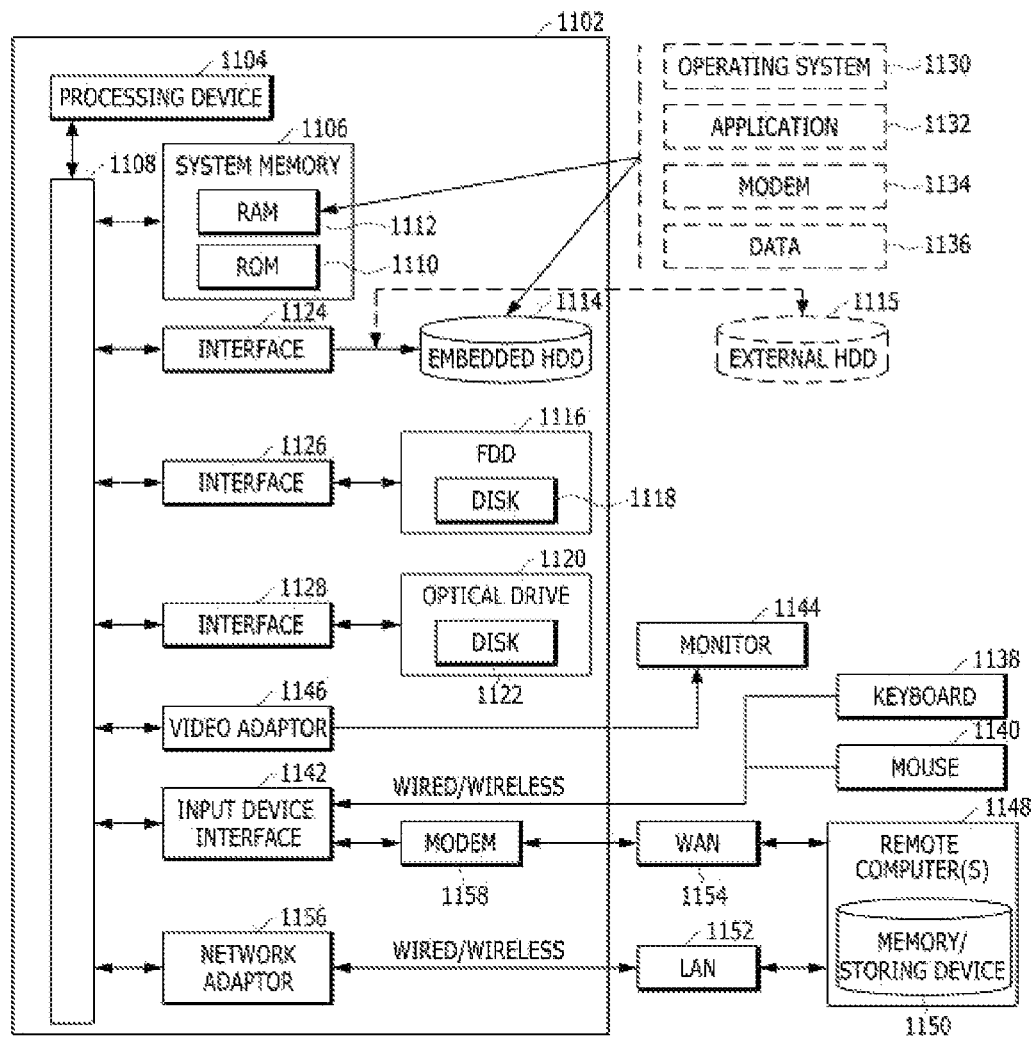
FIG. 16 is a simple and general schematic view of an exemplary computing environment in which exemplary embodiments of the present disclosure may be implemented.

FIG. 16 is a simple and general schematic view of an exemplary computing environment in which exemplary embodiments of the present disclosure may be implemented.

The present disclosure has generally been described above in association with a computer executable instruction which may be executed on one or more computers, but it will be well appreciated by those skilled in the art that the present disclosure can be implemented through a combination with other program modules and/or a combination of hardware and software.

In general, the program module includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Any medium accessible by a computer may be a computer readable medium, and the computer readable medium may include a computer readable storage medium and a computer readable transmission medium. The computer readable storage includes volatile and nonvolatile media and movable and non-movable media. The computer readable storage media include volatile and non-volatile media and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally include information transfer media that implement the computer readable command, the data structure, the program module, or other data in a carrier wave or a modulated data signal such as other transport mechanism. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" includes a wireless channel and various other media that can store, possess, and/or transfer instruction(s) and/or data, but is not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is consistent with the principles and new features presented herein.

What is claimed is:

1. A non-transitory computer readable medium storing a computer program, wherein when the computer program is executed by one or more processors of a computing device, the computer program performs an operation for user drawing-based security authentication, and the operations comprise:
determining to transmit a first control signal to cause a user terminal to display a first drawing input display, which includes one or more subjects, if a lock display release signal is received from the user terminal;
receiving a first drawing input information inputted in accordance with the first drawing input display from the user terminal; and
determining whether to release the lock display of the user terminal by inputting the received first drawing input information to a drawing evaluation model,
wherein the drawing evaluation model is trained to classify a drawing image from a first user into the same group and classify a drawing image from a second user into different groups using training data comprising a drawing input information of the first user as a target image, another drawing input information of the first user as a target similar image, and a drawing input information of the second user as a target dissimilar image.

2. The non-transitory computer readable medium according to claim 1, wherein the operations further comprise:
identifying an idle state of a game executed in the user terminal; and
determining to transmit a second control signal to cause the user terminal to display a second drawing input display based on the identified idle state.

3. The non-transitory computer readable medium according to claim 2, wherein the operation of identifying an idle state of a game executed in the user terminal, comprises at least one of:
identifying a period of time during a first predetermined time from a time point that the game is loaded on the user terminal as the idle state; or
identifying as the idle state, if an input signal for a game executed in the user terminal has not been inputted for a second predetermined time.

4. The non-transitory computer readable medium according to claim 1, wherein the drawing evaluation model is configured to:
store feature data for each user to be matched with user information, wherein the feature data for each user is outputted by inputting the training data in which each of the user information is tagged, to a dimension reduction network function; and
evaluate drawing style similarity based on a comparison result of the feature data for each user and a first drawing feature information, which is outputted by computing first drawing input information using the trained dimension reduction network function.

5. The non-transitory computer readable medium according to claim 4, wherein the drawing style similarity is evaluated by comparing distances on a vector space between the first drawing feature information and the feature data for each user.

6. The non-transitory computer readable medium according to claim 4, wherein the drawing style similarity is evaluated based on a comparison result with feature data of a user that matches user information of the first drawing feature information.

7. The non-transitory computer readable medium according to claim 1, wherein determining whether to release the lock display of the user terminal by inputting the received first drawing input information to a drawing evaluation model, comprises:
performing a first determination whether the first drawing input information matches a user's unique drawing style information by using a drawing style evaluation sub-model included in the drawing evaluation model;
performing a second determination whether the first drawing input information corresponds to the one or more subjects using a drawing recognition sub-model included in the drawing evaluation model; and
determining whether to release the lock screen of the user terminal based on the first determination result and the second determination result.

8. The non-transitory computer readable medium according to claim 7, wherein the performing a first determination whether the first drawing input information matches a user's unique drawing style information by using a drawing style evaluation sub-model included in the drawing evaluation model, comprises:
identifying user information corresponding to the first drawing input information;
acquiring first drawing feature information of the first drawing input information by inputting the first drawing input information to the drawing style evaluation sub-model; and
performing the first determination based on a position in a vector space of the first drawing feature information and a position in the vector space of one or more feature data corresponding to the user information.

9. A method for user drawing-based security authentication, comprising:
determining to transmit a first control signal to cause a user terminal to display a first drawing input display, which includes one or more subjects, if a lock display release signal is received from the user terminal;
receiving a first drawing input information inputted in accordance with the first drawing input display from the user terminal; and
determining whether to release the lock display of the user terminal by inputting the received first drawing input information to a drawing evaluation model,
wherein the drawing evaluation model is trained to classify a drawing image from a first user into the same group and classify a drawing image from a second user into different groups using training data comprising a drawing input information of the first user as a target image, another drawing input information of the first user as a target similar image, and a drawing input information of the second user as a target dissimilar image.

10. A server for user drawing-based security authentication, including:
a processor including one or more cores;
a memory storing program codes executable in the processor;
a network unit transmitting/receiving data with a user terminal, and
wherein the processor is configured to:
determine to transmit a first control signal to cause a user terminal to display a first drawing input display, which includes one or more subjects, if a lock display release signal is received from the user terminal;
receive a first drawing input information inputted in accordance with the first drawing input display from the user terminal; and
determine whether to release the lock display of the user terminal by inputting the received first drawing input information to a drawing evaluation model,
wherein the drawing evaluation model is trained to classify a drawing image from a first user into the same group and classify a drawing image from a second user into different groups using training data comprising a drawing input information of the first user as a target image, another drawing input information of the first user as a target similar image, and a drawing input information of the second user as a target dissimilar image.

* * * * *